US006121612A

United States Patent [19]

Sinor et al.

[11] Patent Number: 6,121,612

[45] Date of Patent: Sep. 19, 2000

[54] NIGHT VISION DEVICE, IMAGE INTENSIFIER AND PHOTOMULTIPLIER TUBE, TRANSFER-ELECTRON PHOTOCATHODE FOR SUCH, AND METHOD OF MAKING

[75] Inventors: Timothy W. Sinor, Plano; Joseph P. Estrera, Dallas; David G. Couch, Van, all of Tex.

[73] Assignee: Litton Systems, Inc., Woodland Hills, Calif.

[21] Appl. No.: 08/955,694

[22] Filed: Oct. 22, 1997

[51] Int. Cl.$^7$ .................... G01T 1/28; H01J 1/34; H01J 40/06

[52] U.S. Cl. .................... 250/330; 250/214 VT; 313/542

[58] Field of Search .................... 250/330, 214 VT; 313/542

[56] References Cited

U.S. PATENT DOCUMENTS

| | | | |
|---|---|---|---|
| 3,814,996 | 6/1974 | Enstrom et al. . | |
| 4,204,118 | 5/1980 | Sheldon | 250/214 VT |
| 4,286,373 | 9/1981 | Gutierrez et al. . | |
| 4,477,294 | 10/1984 | Gutierrez et al. . | |
| 4,498,225 | 2/1985 | Gutierrez et al. . | |
| 4,829,355 | 5/1989 | Munier et al. | 313/542 |
| 5,268,570 | 12/1993 | Kim . | |
| 5,506,402 | 4/1996 | Estrera et al. . | |

FOREIGN PATENT DOCUMENTS

| | | |
|---|---|---|
| 1478453 | 6/1973 | United Kingdom . |

*Primary Examiner*—Constantine Hannaher
*Assistant Examiner*—Andrew Israel

[57] ABSTRACT

A night vision device includes an image intensifier tube having a photocathode responsive to light in the wavelength range extending from about 1 μm to about 2 μm. The photocathode releases photoelectrons in response to photons of light in this wavelength range. A photomultiplier tube includes such a photocathode to provide an image in response to light of such a wavelength. A method of making such a photocathode is set out.

61 Claims, 4 Drawing Sheets

NIGHT VISION DEVICE, IMAGE INTENSIFIER AND PHOTOMULTIPLIER TUBE, TRANSFER-ELECTRON PHOTOCATHODE FOR SUCH, AND METHOD OF MAKING

BACKGROUND OF THE INVENTION

1. Field of the Invention

This invention is in the field of night vision devices which provide a visible image from low-level visible light or from light in the infrared (invisible) portion of the spectrum by use of an image intensifier tube. As used herein, the term "light" means electromagnetic radiation, regardless of whether or not this light is visible to the human eye.

Image intensifier tubes of such night vision devices generally include a photocathodes which is responsive to light in the red end of the visible spectrum as well as in the infrared spectral range to release photoelectrons.

Thus, the present invention is also in the field of such photocathodes.

The photoelectrons released by the photocathode within such an image intensifier tube may be amplified or multiplied by conventional devices such as a microchannel plate or dynode to provide, for example, a current indicative of a light flux, or to produce an image of a light source or of an object illuminated with infrared light.

One embodiment of a photocathode according to the present invention includes a fully-absorptive photon-absorbing layer of indium gallium arsenide (InGaAs), and an electron-emitting layer of indium potassium (InP).

2. Related Technology

Night vision devices which use an image intensifier tube are well known. Generally, such devices include an objective lens by which light from a distant scene is received and focused upon a photocathode of the image intensifier tube. A power supply of the device provides appropriate voltage levels to various connections of the image intensifier tube so that this tube responsively provides a visible image. An eyepiece lens of the device provides the visible image to a user of the device.

Particularly, the image intensifier tube includes a photocathode responsive to light photons within a certain band of wavelengths to liberate photoelectrons. Because the photons are focused on the photocathode in a pattern replicating an image of a scene, the photoelectrons are liberated from the photocathode in shower having a pattern replicating this image of the scene. Within the image intensifier tube, the photoelectrons are moved by an applied electrostatic field to a microchannel plate, which includes a great multitude of microchannels. Each of the microchannels is effectively a dynode, which liberates secondary emission electrons in response to photoelectrons liberated at the photocathode. The shower of secondary emission electrons from the microchannel plate are moved to a phosphorescent screen which provides a visible image in yellow-green phosphorescent light.

Conventional photocathodes are disclosed in each of the following United States or foreign patents:

U.S. Pat. No. 3,814,996, issued Jun. 4 1974, is believed to disclose a photocathode of an ternary alloy of indium, gallium, and arsenide of the formula $Ih_xGa_{1-x}As$, in which "x" has a value of from 0.15 to 0.21.

U.S. Pat. No. 4,286,373, issued Sep. 1, 1981, is believed to disclose a photocathode of gallium arsenide at the photo-emitting layer, and is associated with a layer of gallium, aluminum, arsenide as a passivating layer.

U.S. Pat. No. 4,477,294, issued Oct. 16, 1984, is believed to relate to a photocathode of gallium arsenide as the photo-emitting layer, which is formed by hybrid epitaxy.

U.S. Pat. No. 4,498,225, issued Feb. 12, 1985, is thought to disclose a photocathode of gallium arsenide, formed on a glass substrate with intervening layers of gallium, aluminum, arsenide as passivation and anti-reflection layers.

U.S. Pat. No. 5,047,821, issued Sep. 10, 1991 is believed to relate to a transferelectron photodiode and photocathode structure in which a metallization at the electron-emitting face of the photocathode is supplemented by addition of a grid which is preferably of radial-spoke configuration. This photocathode includes a photon-absorbing layer which is only from 200 nm to 2 $\mu$m thick. An electron-emitting layer of this photocathode is from 200 nm to 1 $\mu$m thick.

U.S. Pat. No. 5,268,570, relates to a photocathode of indium gallium arsenide, grown on an aluminum indium arsenide window layer.

Similarly, U.S. Pat. No. 5,506,402, relates to a photocathode of indium gallium arsenide, grown on an aluminum gallium arsenide window layer.

British patent No. 1,478,453, issued Jun. 29 1977, is believed to disclose a photocathode comprising $(Ga_{1-x}Al_x)_{1-z}In_z$ As, wherein ($0 \leqq z<y$).

It may be that none of these conventional photocathodes are capable of providing a desired level of spectral response in the 1 to 2 $\mu$m wavelength band. Particularly, none of these conventional photocathodes are believe to be able to provide a sufficient response substantially at the 1.54 $\mu$m wavelength which is provided by erbium-doped glass lasers. Use of such erbium-doped glass lasers is particularly desired for illumination, spotting, and designation uses because they are eye-safe. Further, conventional night vision equipment does not respond to light of this wavelength. That is, a photocathode having such a response is desired for night vision equipment in order to allow, for example, imaging using active illumination of a scene with such an erbium-doped glass laser. This would be a particular advantage in the military and police areas of imaging because present GEN-III night vision equipment is not able to provide detection of such laser light.

That is conventional S-20 (alkali-based) photocathodes will not provide an image to such light, and conventional semiconductor-based photocathodes, which generally employ GaAs, have a long-wavelength cutoff of about 900 nm (0.9 $\mu$m). Accordingly, police equipped with advanced night vision equipment responsive to wavelengths above 1 $\mu$m, and using 1.54 $\mu$m laser illumination would be able to see in total darkness without providing an image to conventional GEN-III night vision equipment, and not allowing the users of such conventional equipment to sight on the illumination laser lights of the police.

The cutoff wavelength for a conventional semiconductor photocathode can be extended to the range of 900–1100 nm by using a ternary compound of indium, gallium, and arsenide. While the quantum efficiency of such photocathodes is less than conventional GaAs photocathodes, the greater photon availability under night-sight conditions compensates for this loss of efficiency. Further, the night sky is rich in light in the 1.1–1.8 $\mu$m band. Attempts by researchers in the field to extend the spectral range for photocathodes deeper into the infrared portion of the spectrum have lead to the development of so called "transfer electron" photocathodes. These photocathodes are based on the transfer of thermalized electrons in the conduction band. These thermalized electrons are transferred to higher conduction bands under the influence of a reverse bias. In the higher conduction bands, the electrons can escape into the vacuum within an image intensifier tube. A coating of silver has been used on the electron emitting surface to provide a reverse bias and a Schottky barrier contact. These conventional photocathodes have shown some responses in the range from about 1.1 to about 1.6 μm; but generally also needed to be cooled to temperatures considerably below room temperature in order to help their performance. That is, these photocathodes are believed not to have operated at room temperature while providing the desired response to 1–2 μm light.

Further to the above, scientific uses of such a photocathode are many. For example, there exists now no acceptably inexpensive large-format photon detector for use in the 1–2 μm range. Present photodiodes which are responsive in this wavelength band limit users to a tiny reception format (i.e., about 1–2 μm diameter reception area) with no internal gain. The alternative prior to this invention was to use a high-cost photomultiplier tube which possesses a very limited lifetime, presents reliability concerns, may require cryogenic cooling, and has a high cost.

A large format photomultiplier tube able to provide a response in the 1–2 μm range at room temperature would be desirable.

SUMMARY OF THE INVENTION

In view of the deficiencies of the related technology, a primary object for this invention is to avoid one or more of these deficiencies.

A further object for this invention is to provide a photocathode having an spectral response in the 1–2 μm range.

Further, an objective is to provide such a photocathode which is able to provide such a response at room temperature.

Another objective for this invention is to provide an image intensifier tube having such a photocathode.

Yet another object for this invention is to provide a night vision device including an image intensifier tube having such a photocathode.

Still another object for this invention is to provide a photomultiplier tube having a photocathode providing a response in the 1–2 μm range at room temperature.

Accordingly, the present invention provides according to one aspect, a photocathode for receiving photons of light having wavelengths in the range including 1 μm to 2 μm and responsively emitting photoelectrons; the photocathode comprising a transparent substrate; a substantially completely absorbing photon-absorbing layer of InGaAs carried by the substrate and receiving the photons of light to release photoelectrons; an electron-emitting layer of InP associated with the photon-absorbing layer to receive photoelectrons therefrom and defining a vacuum-exposed surface from which photoelectrons are emitted; and a surface layer of metallic material carried on the vacuum-exposed surface of the electron-emitting layer.

According to another aspect, the present invention provides a method of making a photocathode which is responsive to photons of infrared light having wavelengths in the range including 1 μm to 2 μm to emit photoelectrons; the method including steps of: providing a transparent substrate; carrying a substantially completely absorbing photon-absorbing layer of InGaAs on the substrate; utilizing the photon-absorbing layer to receive photons of light to responsively release photoelectrons; providing an electron-emitting layer of InP associated with the photon-absorbing layer to receive the photoelectrons from the photon-absorbing layer; utilizing the electron-emitting layer to define a vacuum-exposed surface; providing a surface layer of metallic material carried on the vacuum-exposed surface of the electron-emitting layer; and causing the electron-emitting layer to emit photoelectrons through the surface layer into a vacuum.

An advantage of the present photocathode, of an image intensifier tube including such a photocathode, of a night vision device including such an image intensifier tube, and of a photomultiplier tube having such a photocathode is that the photocathode and devices including such a photocathode are able to provide a usable response to photons in the 1–2 μm range at room temperature.

These and additional objects and advantages of the present invention will be apparent from a reading of the following detailed description of a preferred exemplary embodiment of the invention taken in conjunction with the appended drawing Figures. In the appended drawing Figures the same features, or features which are analogous in structure or function, are indicated with the same reference numeral.

BRIEF DESCRIPTION OF THE DRAWING FIGURES

FIG. 1 provides a diagrammatic cross sectional view of a night vision device;

FIG. 2 provides a cross sectional view of an image intensifier tube which may be used in a night vision device, and which may include a photocathode according to this invention;

FIG. 3 provides a cross sectional view of a photomultiplier tube which includes a photocathode embodying the present invention;

FIG. 4 is a cross sectional view of a photocathode assembly embodying the present invention, and which may be used, for example, in an image intensifier tube or photomultiplier tube according to the present invention;

FIG. 5 provides a diagrammatic cross sectional view of a manufacturing intermediate product which is used to make a photocathode as seen in FIG. 3, and which also illustrates steps in the method of making such a photocathode;

FIG. 6 provides a graph showing a typical spectral response of photoelectron emission for a photocathode embodying the invention as a function of wavelength of incident light; and FIGS. 7, 8, and 9 each provide fragmentary cross sectional views of respective alternative embodiments of transfer electron photocathodes embodying the present invention.

DETAILED DESCRIPTION OF PREFERRED

Exemplary Embodiments of the Invention

The following is a description of selected exemplary preferred embodiments of the present invention, and as such is not to be taken as limiting or exhaustive of all possible embodiments of the invention, nor indicative of the entire and complete scope of the invention to the exclusion of all other possible embodiments. Other possible embodiments of the present invention will certainly suggest themselves to those ordinarily skilled in the pertinent arts, and will be recognized as being within the scope of this invention. Accordingly, the invention is to be seen as being limited and defined only by the spirit and scope of the appended claims, giving cognizance to equivalents in structure and function in all respects.

Figure 1:
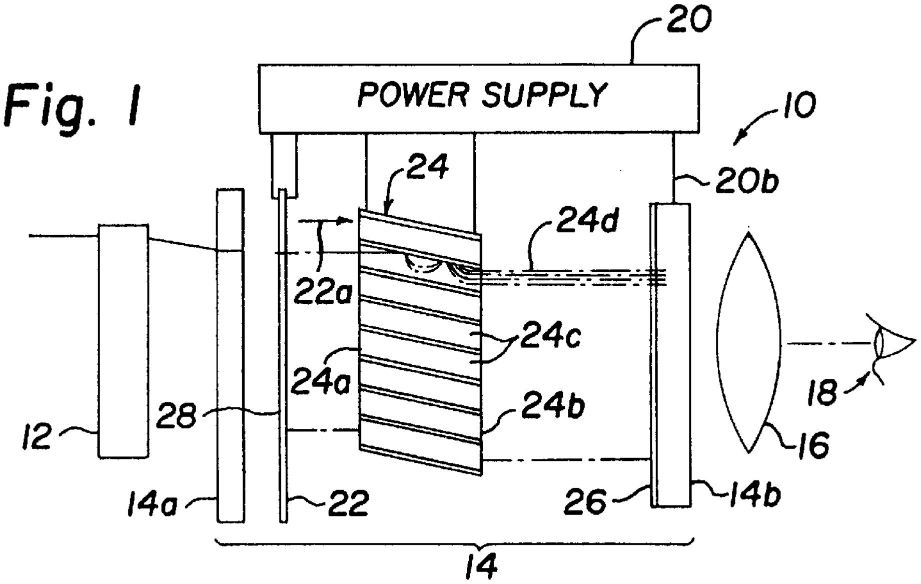

Viewing the appended drawing Figures in conjunction with one another, and viewing first FIG. 1, an exemplary and highly diagrammatic night vision device 10 is illustrated. This night vision device 10 includes an objective lens 12 focusing light 12*a* from a distant scene through an input window 14*a* of an image intensifier tube 14. It will be understood that although a single objective lens 12 is illustrated, the night vision device 10 may include more than one lens providing an objective for the image intensifier tube 14. The image intensifier tube 14 includes an output window 14*b* at which a visible image is provided. This visible image is provided by an eyepiece lens 16 to a user 18. Again, the eyepiece 18 may include more than one lens. A power supply 20 including a battery 20*a*, provides power over connections 20*b* for operation of the image intensifier tube 14.

Figure 2:
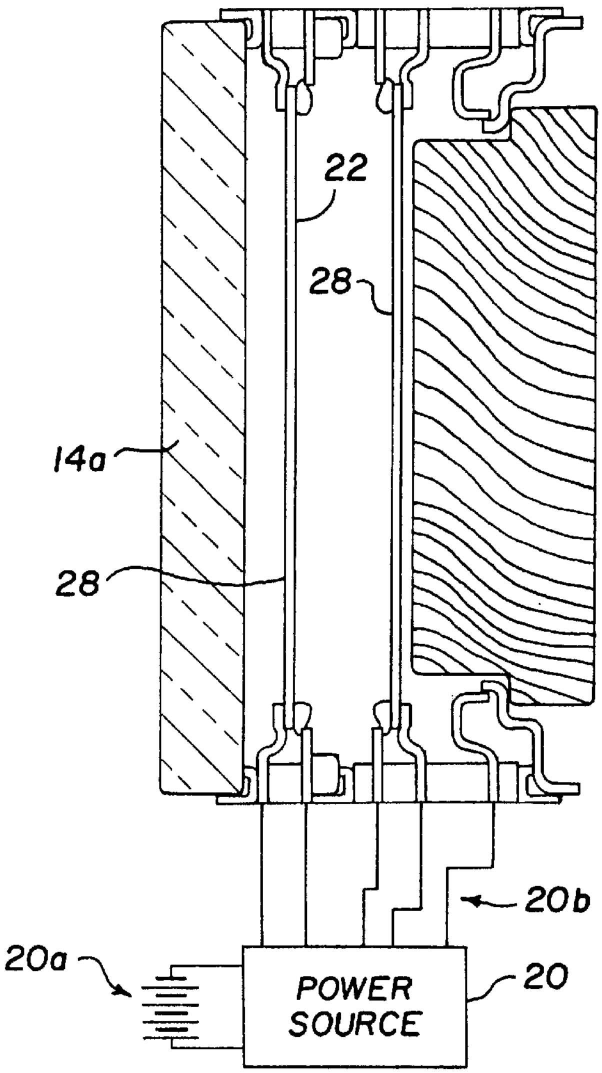

Considered more particularly, the image intensifier tube 14 is seen in FIG. 2 to include a photocathode 22 which is carried in spaced relation to the input window 14*a*, and upon which the light is focused by objective lens 12. This photocathode 22 responsively liberates photoelectrons, indicated by arrows 22*a*, in a pattern replicating the image focused on this photocathode. The photoelectrons 22*a* are moved by a prevailing electrostatic field maintained by power supply 20 to a microchannel plate 24 having opposite faces 24*a* and 24*b*. Face 24*a* is an input face, while face 24*b* is an output face, as will be seen. Extending between the opposite faces 24*a* and 24*b* is a great multitude of microchannels, indicated generally be arrowed numeral 24*c*. These microchannels have an inner surface formed of a material which is an emitter of secondary electrons, so that each microchannel is individually a dynode. The photoelectrons from photocathode 22 thus enter the microchannels 24*c* and cause the emission of a correspondingly greater number of secondary emission electrons.

As a result, a great number of secondary emission electrons (indicated by arrows 24*d*) still in a pattern replicating the image focused on photocathode 22, is released by the microchannel plate 24. This shower of secondary emission electrons travels under the influence of another electrostatic field to an output electrode 26. The output electrode 26 may take a variety of forms, but preferably includes an aluminized phosphorescent screen coating, indicated with arrowed numeral 26*a*. This phosphorescent screen may be carried by the output window 14*b*. Also, in response to the shower of secondary emission electrons the phosphorescent screen produces a visible image in response to the shower of secondary emission electrons, and this image is transmitted out of the tube 14 via the output window 14*b*.

Figure 3:
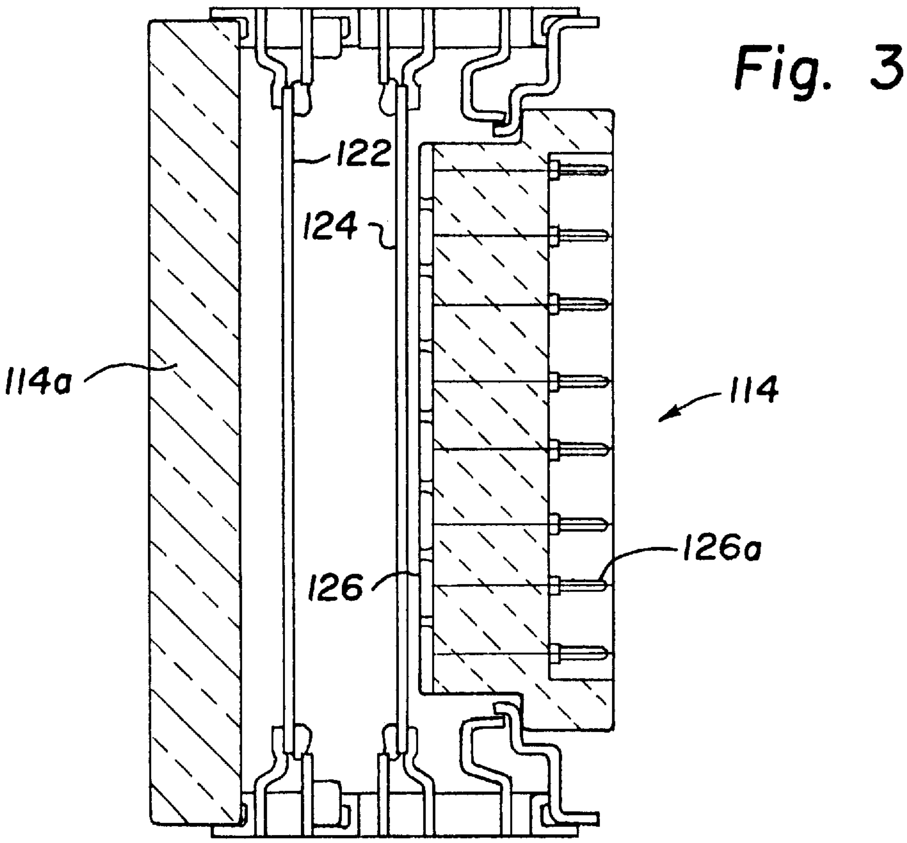

In FIG. 3 is seen an exemplary photomultiplier tube. This photomultiplier tube is similar in many respects to the image intensifier tube seen in FIG. 2. Accordingly, in order to obtain reference numerals for use in describing the photomultiplier tube of FIG. 3, features which are the same or which are analogous in structure or function to those depicted and described above are referenced in FIG. 3 with the same numeral used above, and increased by one-hundred (100). The photomultiplier tube 114 of FIG. 3 includes a photocathode 122 which is carried in spaced relation to the input window 114*a*, and upon which light is incident. In many cases, the photomultiplier tube 114 is going to produce a responsive electrical output but not necessarily an image so the incident light is not necessarily focused, on the other hand, it will be recognized that some photomultiplier uses involve the detection of the location of a source of infrared light, so the light incident on the photocathode 122 may be focused. Still other photomultiplier tubes are arranged to provide an electrical output signal indicative of an image so the incident light to these tubes will be focused, as will be further explained.

Importantly, this light will include light in the 1–2 $\mu$m range. The photocathode 122 also responsively liberates photoelectrons to a microchannel plate 124 having opposite faces 124*a* and 124*b*. Each microchannel is individually a dynode, and provides a multitude of secondary emission electrons in response to each photoelectron falling into a particular microchannel. Recalling the description above, it is easily understood that a great number of secondary emission electrons is released by the microchannel plate 124. This shower of secondary emission electrons in this case travels in the tube 114 to an output electrode 126.

The output electrode 126 may take a variety of forms. One form of output electrode is simply a single metallic conductive target for the secondary emission electrons. This type of output electrode provides a current output indicate of the magnitude of infrared light falling on the photocathode 122. Another type of output electrode has a multitude of metallic conductive sub-electrode targets in a mosaic pattern. This type of photomultiplier tube is depicted in FIG. 3, although it will be understood that the invention is not so limited. This photomultiplier tube has a respective electrical connection pin 126*a* outwardly disposed on the rear of the tube and individually connecting to a respective one of the sub-electrodes inside of the tube. In this way, the electrical signals obtained from the pins 126*a* represent a mosaic of the infrared light entering via window 114*a*. That is, each sub-electrode of the output electrode mosaic 126 is individually conducted outwardly of the tube, and by its individual current flow level can provide a pixelized (or mosaic) representation of the infrared source providing photons to the photocathode.

Yet another type of possible output electrode involves a charge-coupled device disposed at the location indicated with numeral 126 in FIG. 3. In this case, the output electrical signal of the output electrode (i.e., charge coupled device) can provide an actual pixelized image of the infrared photon source. In all cases, the output of the tube 114 is an electrical signal (i.e., not an image directly). However, the electrical output signal from such photomultiplier tubes can possibly be used to provide an image.

Figure 4:
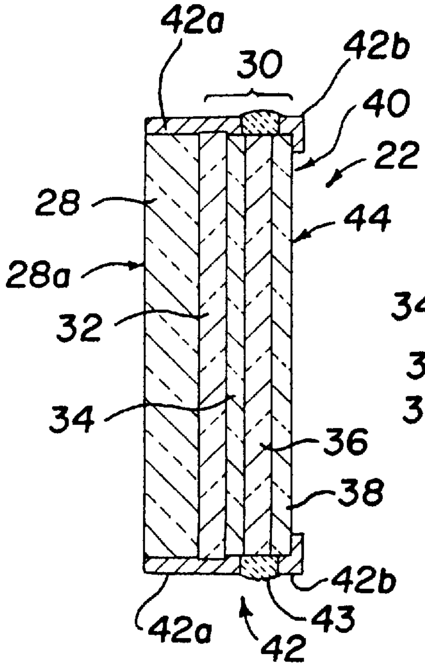

Now particularly viewing FIG. 4, it is seen that the photocathode 22 (122 also) includes a transparent and supportive substrate portion 28. Again, it is to be noted that the photocathode of FIG. 4 may be used in making an image intensifier tube, or a photomultiplier tube, and other devices as well. Accordingly, this will be kept in mind in view of the following, and it will be recognized that the added one-hundred (100) which was used for purposes of describing the photomultiplier tube of FIG. 3 has been dropped from the reference numerals of FIG. 4.

The substrate portion 28 serves to support active portions of the photocathode 22, and to transmit photons of light to the active portions of the photocathode. Preferably, the substrate portion 28 is formed of glass, such as Corning 7056 glass. This Corning 7056 glass may be used advantageously as the substrate portion 28 because its coefficient of thermal expansion closely matches that of other portions of the photocathode 22. Alternatively, other materials may be used for the substrate portion 28. For example, single-crystalline sapphire ($A1_2O_3$), gallium arsenide (GaAs), or indium phosphide (InP) might be used as the material for substrate portion 28. Thus, the present invention is not limited to use of any particular material for substrate portion 28.

Supported by the substrate portion 28 are an anti-reflective coating (indicated with arrowed numeral 28*a*), and the active portions of the photocathode 22 (which are collectively indicated generally with the numeral 30). These active portions are configured as successive layers, each cooperating with the whole of the photocathode structure 22 to achieve the objects of this invention. More particularly, adjacent to the substrate 28 is an anti-reflection (and thermal bonding) coating 32 of silicon nitride (Si3N4) and silicon dioxide (SiO2).

Upon the layer 32 is carried a completely-absorbing (i.e., opaque) photon-absorbing layer 34. The layer 34 is preferably formed of indium gallium arsenide (InGaAs) and has a thickness sufficient to absorb substantially all of the infrared photons entering via substrate 28. Preferably, the layer 34 of InGaAs has a thickness of from 1–3 $\mu$m, and most preferably, layer 34 is about 2 $\mu$m thick. The layer 34 may be undoped, but is most preferably doped with a P-type dopant to a level as high as about $3\times10^{18}$ atoms/$cm^3$. Zinc (Zn) may be used as this P-type dopant.

Next, a graded heterojunction layer 36 is provided next to the layer 34. This graded layer 36 is formed of indium gallium arsenide (InGaAs) and indium gallium arsenide phosphide (InGaAsP). The thickness of the layer 36 may preferably be from about 0.05 $\mu$m to about 0.2 $\mu$m. This layer 36 is also includes a P-type dopant, and Zinc may be used as the dopant. Preferably, the P-type dopant is used at a level of from $1\times10^{18}$ to $3\times10^{18}$ atoms/$cm^3$.

An electron-emitter layer 38 is joined to the heterojunction layer 36. This electron-emitting layer is formed of indium phosphide (InP). Preferably, this electron-emitting layer has a thickness of from 0.5 mm to about 1.5 mm, and is most preferably about 1.0 mm thick. This layer 38 is also doped using a P-type dopant (zinc may be used) to a level of about $1\times10^{18}$ atoms/$cm^3$.

This layer 38 which is referred to above as the electron-emitting layer actually carries a layer 40 of silver (Ag) which provides a conductive electrode for application of a bias voltage to the photocathode 22, and from which electrons are actually liberated into the vacuum interior of a tube (i.e., into a photomultiplier or image intensifier tube). Because it is very thin, the layer of silver is not shown as a separate layer in FIG. 4, but is indicated with the arrowed numeral 40 to indicated its presence somewhat as a surface-treatment. This layer of silver is from about 50 to about 100 Angstroms thick.

The photocathode 22 also includes a two-part peripheral electrode 42, one part 42*a* of which generally extends circumferentially about the photocathode assembly 22 adjacent to and making electrical contact with the photon-absorbing layer 34. The electrode 42 also includes a second circumferentially extending part 42*b* which is electrically conductive with electron-emitting layer 38 via the silver coating 40. In order to insulate these two circumferential electrode parts 42*a* and 42*b* from one another, the photocathode 22 also includes a circumferential insulating band 43 which is interposed between the electrically conductive electrode parts 42*a* and 42*b*. Preferably, the insulating band 43 is formed of ceramic material. The power supply 20, seen in FIG. 2 for example, maintains an electrostatic field across the active layers 30 of the photocathode. This field is most negative at layer 34 and most positive at layer 38. Consequently, photoelectron liberated in the photon-absorbing InGaAs layer 34 are moved in the active layers 30 to the electron-emitting layer 38. Preferably, a circumferential band 42*c* of ceramic or other insulative material surrounds the active layers 30 and extends between the conductive electrode coatings 42*a* and 42*b* in order to better insulate and separate these electrodes from one another.

The electron-emitting layer 38 is also activated at its vacuum-exposed surface using conventional current-peaking techniques while the photocathode is illuminated with infrared light and being bombarded with atoms of cesium (Cs) and oxygen ($O_2$) applied onto and through the silver layer 40 to achieve negative electron affinity. This surface activation with Cs and $O_2$ is indicated on FIG. 4 with the arrowed numeral 44.

Figure 6:
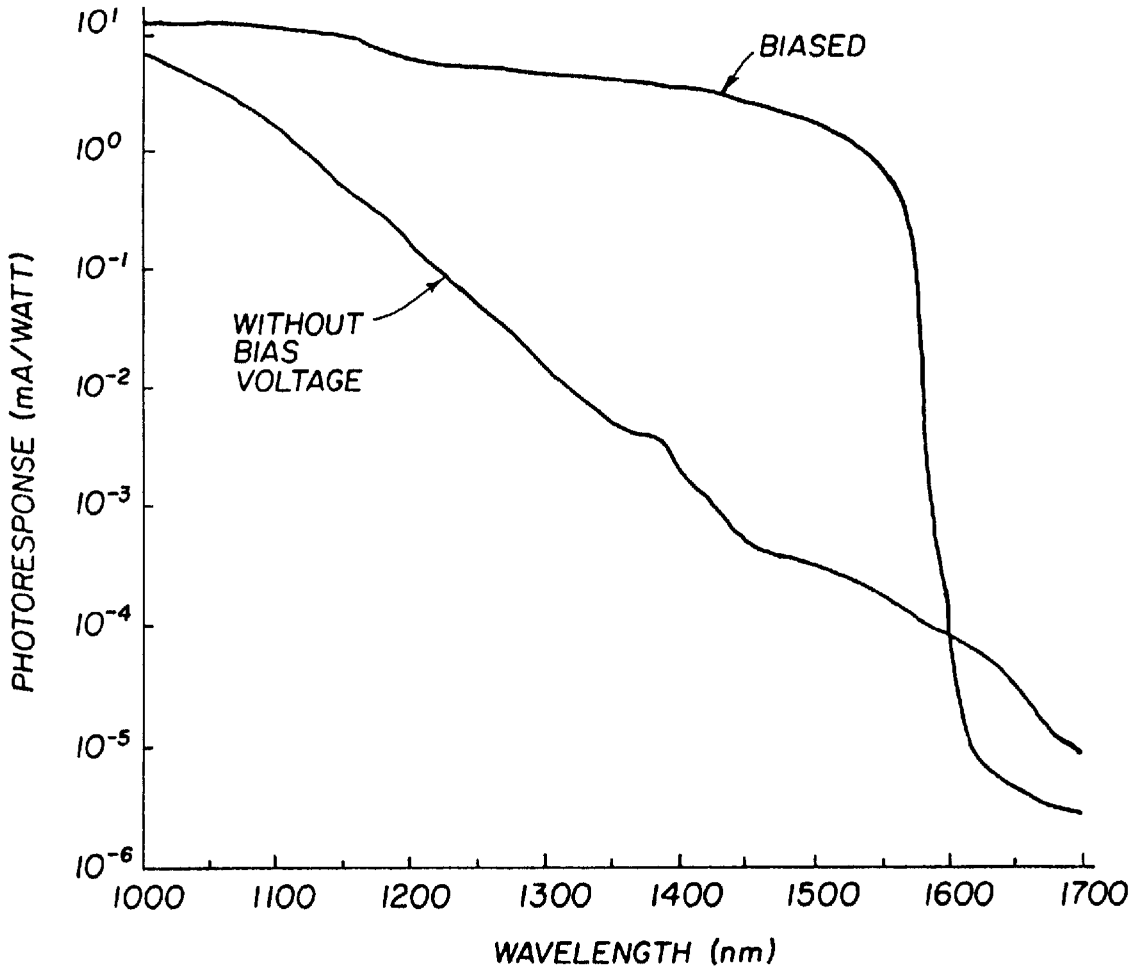

A photocathode according to the invention as described above is expected to show a quantum efficiency of from about 8% to as much as 20% in response to light having wavelengths in the 1 $\mu$m to 2 $\mu$m band, and without requiring cooling to temperatures below room temperature. Usable responses will be provided by this photocathode at both the 1.06 $\mu$m (Nd:Yag laser), and 1.54 $\mu$m (erbium-doped glass laser) wavelengths. FIG. 6 provides a graphical representation of an expected response from a photocathode according to FIG. 4.

Figure 5:
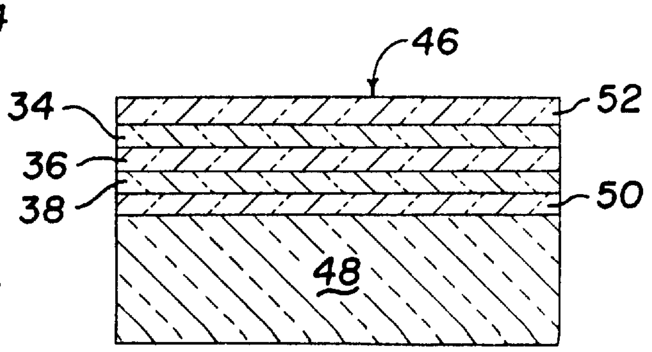

Turning now to FIG. 5, a manufacturing intermediate product 46 used to make a photocathode assembly 22 as seen in FIG. 4 is depicted. Accordingly, the following description of the structure of the product 46 may also be taken as a description of the method steps used in making this product and the photocathode assembly 22. This manufacturing intermediate product 46 includes a manufacturing substrate 48, a stop layer 50, electron-emitting layer 38, graded heterojunction-junction layer 36, photon-absorbing layer 34, anti-reflection layer 32, and a protective cap layer 52.

Preferably, the product 42 is fabricated using manufacturing methods, techniques, and equipment conventionally used in making GEN III image intensifier tubes. Accordingly, much of what is seen in FIG. 5 will be familiar to those ordinarily skilled, although the combination of materials and constituent percentages of elements and dopants of the structures depicted differ from the conventional.

The manufacturing substrate 48 is preferably a wafer of gallium arsenide (GaAs) single crystal material having a low density of crystalline defects. Other types of substrates could be used, but the substrate manufacturing 48 serves as a base upon which the layers 50, 38, 36, 34, and 52 are grown epitaxially (recited in the order of their growth on this manufacturing substrate). Conventional fabrication processes such as MOCVD, MBE, and MOMBE, which are conventional both to the semiconductor circuit industry and to the art of photocathodes, may be used to form the various layers on manufacturing substrate 48.

First, the stop layer is formed of indium aluminum arsenide (InAlAs). On this stop layer, the electron-emitting layer 38 is formed, followed by heterojunction-junction layer 36, and them by the photon-absorbing layer 34. Each of the photon-absorbing layer 34, heterojunction-junction layer 36, and electron-emitting layer 38 are preferably doped during formation with a P-type impurity in order to provide electron mobility in these layers and a reduced work function for electron escape from the electron-emitting active layer 38 into the vacuum free-space environment inside of tube 14. As mentioned above, zinc may be used as the dopant. Preferably, doping levels of from about $1\times10^{18}$ to about $3\times10^{18}$ atoms/$cm^3$ is used in the layers 34, 36, and 38, and these doping levels need not be the same in each of these layers.

Finally, the cap layer 52 is grown on the photon-absorbing layer 34. This cap layer may be formed of gallium arsenide (GaAs), of indium aluminum arsenide (InAlAs), or of indium gallium arsinide Phosphorous (InGaAsP), for example, and provides for protection of layer 34 during cool down and subsequent transport of the manufacturing intermediate product 46 (i.e., which transport may include exposure to ambient atmospheric conditions) until further manufacturing steps complete its transition to a photocathode assembly (as seen in FIG. 4) and subsequent sealing incorporation into an image intensifier tube.

As those ordinarily skilled will know, after the cap layer is removed and coating 32 applied, the layers 34, 36, 38, and 50 are thermally bonded to the substrate 28 (i.e., by thermal bonding of the layer 32 which serves as a thermal bonding layer also). Next, the stop layer 50 serves to prevent an etch operation which is used to remove the manufacturing substrate 48 from etching into the electron-emitting layer of the photocathode. Next, the stop layer 50 is selectively etched off, the silver layer 40 is applied and electrode 42 (portions 42*a* and 42*b*) is also applied using thin-film techniques, and the surface of electron-emitting layer 38 is cleaned to remove oxides and moisture. The photocathode assembly is then activated using evaporation of cesium and oxygen gas onto the active layer 38 through the silver layer 40 (recalling arrow 44 of FIG. 4). As is usual, the current output of the photocathode is monitored to achieve the best level of negative electron affinity.

As so prepared, the photocathode assembly 22 may be incorporated into a variety of devices, including image intensifier tubes, night vision devices, and photomultiplier tubes.

Figure 7:
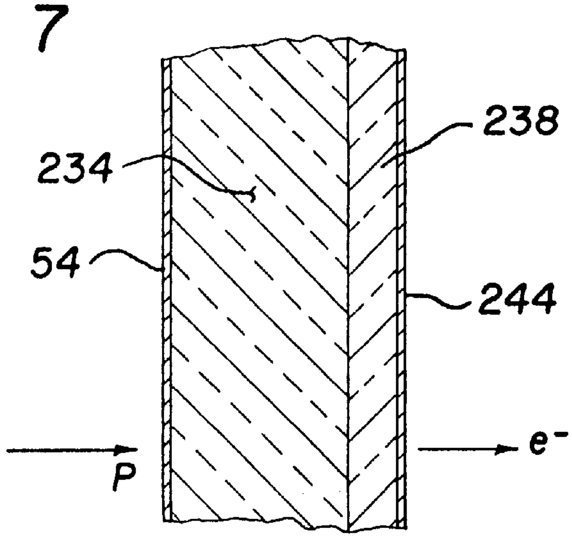
Figure 8:
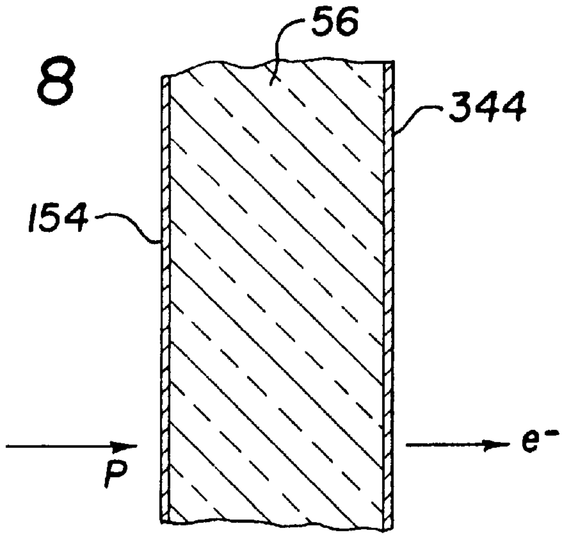
Figure 9:
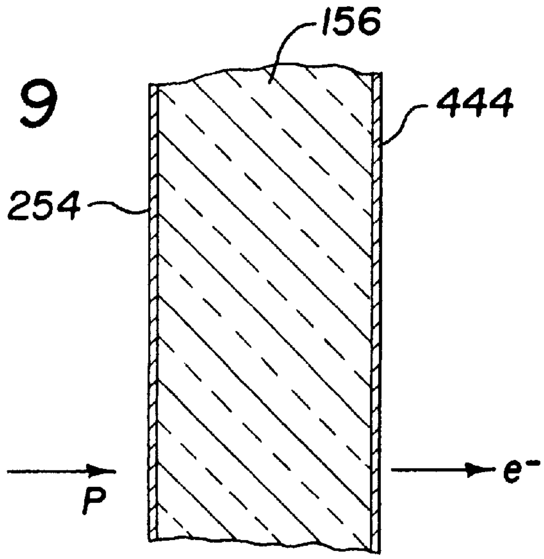

Considering now FIGS. 7, 8, and 9, alternative constructions for a photocathode according to the present invention are depicted. In order to obtain reference numerals for use in describing the structures seen in these Figures, features which are the same as or which are analogous in structure or function to features seen in FIGS. 1–5 are indicated on FIGS. 7–9 with the same numerals used above, and respectively increased by 100 for FIG. 7, by 200 for FIG. 8, and by 300 for FIG. 9. The materials shown in FIGS. 7–9 are preferably doped with P-type dopants consistent with the explanation above.

FIG. 7 shows a dual layer photocathode 222 having a completely absorbing photon-absorbing layer 234 formed of InP. The layer 234 is preferably about 2 mm thick. In contact with layer 234 is an electron emitting layer 238, which is this case is formed of InGaAs. Layer 238 is most preferably about 3 μm thick. The layers 234 and 238 are in direct contact with one another with no intervening heterojunction layer. Each layer 234 and 238 is associated with a respective surface metallization electrode. Electron emitting layer 238 has electrode 244, which is a surface metallization of silver, as discussed above.

Layer 234 carries a surface metallization layer 54 of nickel, which is from 50 μm to about 100 μm thick. The surface metallization electrode 54 is sufficiently thick to provide distribution of electrostatic charge across the photocathode 222, but sufficiently thin that photons of infrared light penetrate this layer to release electrons in layer 234. Again, the released electrons are transferred to higher energy levels by acceleration in the prevailing electrostatic field, and some of these electrons are released into vacuum via the surface of layer 238.

FIG. 8 shows another alternative transfer electron photocathode 322, which in this case includes only a single layer 56 of InGaAs, which is about 2 mm thick. This single layer of InGaAs serves as both a completely absorbing photon-absorbing layer, and as an electron-emitting layer. On its opposite surfaces, the layer 56 carries opposite surface metallization electrodes 154, and 344.

Finally, FIG. 9 shows another alternative single-layer transfer electron photocathode 422. In this case, the single layer 156 is formed of undoped GaSb, and is also completely absorbing. The layer 156 may alternatively be doped with a P-type dopant. The thickness of layer 156 is again about 2 μm. Layer 156 again carries surface metallization electrodes 254 and 444. This photocathode will be most effective in responding to photons in the near infrared portion of the spectrum. This photocathode will provide a response to shorter wavelengths of light more efficiently than conventional GaAs photocathodes, it is believed.

While the present invention has been depicted, described, and is defined by reference to particularly preferred embodiments of the invention, such reference does not imply a limitation on the invention, and no such limitation is to be inferred. The invention is capable of considerable modification, alteration, and equivalents in form and function, as will occur to those ordinarily skilled in the pertinent arts. For example, the present invention is believed to be the first to present single-layer transfer electron photocathodes, as are seen in FIGS. 8 and 9. In view of this teaching, others may apply the suggestion to make other transfer electron photocathodes using the single-layer structure. The present invention teaches for the first time the use of a comparatively thick and self-supporting single-layer transfer electron photocathode. Accordingly, the depicted and described preferred embodiments of the invention are exemplary only, and are not exhaustive of the scope of the invention. Consequently, the invention is intended to be limited only by the spirit and scope of the appended claims, giving full cognizance to equivalents in all respects.

We claim:

1. A transfer-electron photocathode for receiving photons of light and responsively emitting photoelectrons, said transfer-electron photocathode having a vacuum-exposed surface from which the photoelectrons are emitted; the transfer-electron photocathode comprising:

a single comparatively thick and self-supporting layer of photon-absorbing and photoelectron emitting material, said layer substantially defining said vacuum-exposed surface from which the photoelectrons are emitted;

a pair of surface layers of electrically conductive metallic material, one surface layer of said pair being carried on the vacuum-exposed surface of said layer of material, and the other of said pair of surface layers being carried on a photon-admitting surface of the layer.

2. The photocathode of claim 1 in which said pair of surface layers of metallic material includes a layer of silver carried on the vacuum-exposed surface of the layer.

3. The photocathode of claim 1 in which said pair of surface layers of metallic material includes a layer of nickel carried on the photon-admitting surface of the layer.

4. The photocathode of claim 1 in which said layer has a thickness sufficient that it is totally absorbing of infrared photons.

5. The photocathode of claim 1 in which said layer has a thickness in the range from about 1 mm to about 3 mm.

6. The photocathode of claim 5 in which said layer has a thickness of substantially 2 mm.

7. The photocathode of claim 1 in which said layer includes a P-type dopant.

8. The photocathode of claim 6 in which said P-type dopant is present in said layer at a level of from about $1\times10^{18}$ atoms/cm$^3$ to about $3\times10^{18}$ atoms/cm$^3$.

9. The photocathode of claim 7 in which said P-type dopant includes zinc.

10. The photocathode of claim 1 in which said layer includes a material selected from the group consisting of: InGaAs and GaSb.

11. A transfer-electron photocathode for receiving photons of light and responsively emitting photoelectrons; the photocathode comprising:

a first comparatively thick layer of photon-absorbing material, said first layer having a photon-admitting surface;

a second comparatively thin layer of photoelectron emitting material, said second layer defining a vacuum-exposed surface from which the photoelectrons are emitted;

a pair of surface layers of electrically conductive metallic material, one of which is carried on the vacuum-exposed surface of the second layer and the other of which is carried on said photon-admitting surface of the first layer;and said pair of surface layers of metallic material includes a layer of silver carried on the vacuum-exposed surface of the second layer.

12. The photocathode of claim 11 in which said pair of surface layers of metallic material includes a layer of nickel carried on the photon-admitting surface of the first layer.

13. The photocathode of claim 11 in which said first layer has a thickness sufficient that it is totally absorbing of infrared photons.

14. The photocathode of claim 11 in which said first layer has a thickness in the range from about 1 mm to about 3 mm.

15. The photocathode of claim 14 in which said first layer has a thickness of substantially 2 mm.

16. The photocathode of claim 14 in which said second layer has a thickness of substantially 3 $\mu$m.

17. The photocathode of claim 11 in which said first layer and said second layer each include a P-type dopant.

18. The photocathode of claim 17 in which said P-type dopant is present in each layer at a level of from about $1\times10^{18}$ atoms/cm$^3$ to about $3\times10^{18}$ atoms/cm$^3$.

19. The photocathode of claim 18 in which said P-type dopant includes zinc.

20. The photocathode of claim 11 in which said first layer and said second layer each includes a material selected from the group consisting of: InGaAs and InP.

21. A photocathode for receiving photons of light having wavelengths in the range including 1 $\mu$m to 2 $\mu$m and responsively emitting photoelectrons; the photocathode comprising:

a transparent substrate;

a photon-absorbing layer of InGaAs carried by the substrate and receiving the photons of light to release photoelectrons;

an electron-emitting layer of InP receiving photoelectrons from the photon-absorbing layer and defining a vacuum-exposed surface from which photoelectrons are emitted;

a surface layer of electrically conductive metallic material carried on the vacuum-exposed surface of the electron-emitting layer; and, said surface layer of metallic material includes silver.

22. The photocathode of claim 21 in which said photon-absorbing layer has a thickness sufficient that is totally absorbing of photons in the 1–$\mu$m wavelength range.

23. The photocathode of claim 22 in which said photon-absorbing layer has a thickness in the range from about 1 mm to about 3 mm.

24. The photocathode of claim 23 in which said photon-absorbing layer has a thickness of substantially 2 mm.

25. The photocathode of claim 21 in which said photon-absorbing layer includes a P-type dopant.

26. The photocathode of claim 25 in which said P-type dopant is present in said photon-absorbing layer at a level of about $3\times10^{18}$ atoms/cm$^3$.

27. The photocathode of claim 26 in which said P-type dopant includes zinc.

28. The photocathode of claim 21 in which said electron-emitting layer has a thickness in the range of from about 0.5 mm to about 1.5 mm.

29. The photocathode of claim 28 in which said electron-emitting layer has a thickness of about 1.0 mm.

30. The photocathode of claim 21 in which said electron-emitting layer includes a P-type dopant.

31. The photocathode of claim 30 in which said P-type dopant is present in said electron-emitting layer at a level of about $1\times10^{18}$ atoms/cm$^3$.

32. The photocathode of claim 31 in which said P-type dopant includes zinc.

33. A photocathode for receiving photons of light having wavelengths in the range including 1 $\mu$m to 2 $\mu$m and responsively emitting photoelectrons; the photocathode comprising:

a transparent substrate;

a photon-absorbing layer of InGaAs carried by the substrate and receiving the photons of light to release photoelectrons;

an electron-emitting layer of InP receiving photoelectrons from the photon-absorbing layer and defining a vacuum-exposed surface from which photoelectrons are emitted;

a surface layer of electrically conductive metallic material carried on the vacuum-exposed surface of the electron-emitting layer; and, a graded heterojunction of InGaAs and InGaAsP interposed between said photon-absorbing layer and said electron-emitting layer.

34. The photocathode of claim 33 in which said graded heterojunction includes a P-type dopant.

35. The photocathode of claim 34 in which said P-type dopant is present in said graded heterojunction to a level of from about $1\times10^{18}$ atoms/cm$^3$ to about $3\times10^{18}$ atoms/cm$^3$.

36. The photocathode of claim 33 in which said electron-emitting layer has a thickness in the range of from about 0.5 mm to about 1.5 mm.

37. The photocathode of claim 36 in which said electron-emitting layer has a thickness of about 1.0 mm.

38. The photocathode of claim 33 in which said electron-emitting layer includes a P-type dopant.

39. The photocathode of claim 38 in which said P-type dopant is present in said electron-emitting layer at a level of about $1\times10^{18}$ atoms/cm$^3$.

40. The photocathode of claim 39 in which said P-type dopant includes zinc.

41. A method of making a photocathode which is responsive to photons of infrared light having wavelengths in the range including 1 $\mu$m to 2 $\mu$m to responsively emit photoelectrons; the method including steps of:

providing a transparent substrate;

carrying a photon-absorbing layer of InGaAs on the substrate;

utilizing the photon-absorbing layer to receive photons of light to responsively release photoelectrons;

providing an electron-emitting layer of InP to receive the photoelectrons from the photon-absorbing layer;

utilizing the electron-emitting layer to define a vacuum-exposed surface;

providing a surface layer of electrically conductive metallic material carried on the vacuum-exposed surface of the electron-emitting layer;

causing the electron-emitting layer to emit photoelectrons through the surface layer into a vacuum; and, including silver in the surface layer of metallic material.

42. The method of claim 41 including the step of making the photon-absorbing layer sufficiently thick that it is totally absorbing of photons in the 1–2 μm wavelength range.

43. The method of claim 41 further including the step of making the electron-emitting layer with a thickness in the range of from about 0.5 mm to about 1.5 mm.

44. A night vision device having an objective lens, an image intensifier tube, and an eyepiece lens, the image intensifier tube having a photocathode responsive to infrared light, said photocathode of said image intensifier tube comprising:

a completely-absorbing photon-absorbing layer of material receiving the photons of light to release photoelectrons;

an electron-emitting surface which is vacuum-exposed and from which photoelectrons are emitted;

a surface layer of metallic material carried on the vacuum-exposed surface of the electron-emitting layer;

means for applying an electrostatic field across the photon-absorbing layer; and, said surface layer of metallic material includes silver.

45. The night vision device of claim 44 in which said photon-absorbing layer has a thickness sufficient that is totally absorbing of photons in the 1–2 μm wavelength range.

46. The night vision device of claim 45 in which said photon-absorbing layer has a thickness in the range from about 1 mm to about 3 mm.

47. The night vision device of claim 46 in which said photon-absorbing layer has a thickness of substantially 2 mm.

48. The night vision device of claim 46 in which said photon-absorbing layer includes a P-type dopant.

49. The night vision device of claim 48 in which said P-type dopant is present in said photon-absorbing layer at a level of about $3\times10^{18}$ atoms/cm$^3$.

50. The night vision device of claim 48 in which said P-type dopant includes zinc.

51. The night vision device of claim 44 further including a graded heterojunction of InGaAs and InGaAsP interposed between said photon-absorbing layer and said electron-emitting layer.

52. The night vision device of claim 51 in which said graded heterojunction includes a P-type dopant.

53. The night vision device of claim 52 in which said P-type dopant is present in said graded hetero junction to a level of from about $1\times10^{18}$ atoms/cm$^3$ to about $3\times10^{18}$ atoms/cm$^3$.

54. The night vision device of claim 44 in which said electron-emitting layer has a thickness in the range of from about 0.5 mm to about 1.5 mm.

55. The night vision device of claim 54 in which said electron-emitting layer has a thickness of about 1.0 mm.

56. The night vision device of claim 55 in which said P-type dopant is present in said electron-emitting layer at a level of about $1\times10^{18}$ atoms/cm$^3$.

57. The night vision device of claim 55 in which said P-type dopant includes zinc.

58. The night vision device of claim 44 in which said electron-emitting layer includes a P-type dopant.

59. A night vision device having an objective lens, an image intensifier tube, and an eyepiece lens, the image intensifier tube having a photocathode responsive to infrared light, said photocathode of said image intensifier tube comprising:

a completely-absorbing photon-absorbing layer of material receiving the photons of light to release photoelectrons;

an electron-emitting surface which is vacuum-exposed and from which photoelectrons are emitted;

a surface layer of metallic material carried on the vacuum-exposed surface of the electron-emitting layer;

means for applying an electrostatic field across the photon-absorbing layer; and, said means for applying an electrostatic field across the photon-absorbing layer includes a surface electrode layer of conductive material.

60. The night vision device of claim 59 in which said surface electrode layer of conductive material includes nickel.

61. A photocathode for receiving photons of light having wavelengths in the range including 1 μm to 2 μm and responsively emitting photoelectrons; the photocathode comprising:

a transparent substrate;

a photon-absorbing layer of InGaAs carried by the substrate and receiving the photons of light to release photoelectrons;

an electron-emitting layer of InP receiving photoelectrons from the photon-absorbing layer and defining a vacuum-exposed surface from which photoelectrons are emitted;

a surface layer of electrically conductive metallic material carried on the vacuum-exposed surface of the electron-emitting layer; and, a surface layer treatment of said vacuum-exposed surface of said electron-emitting layer, said surface layer treatment including atoms of cesium and oxygen applied to said vacuum-exposed surface.

* * * * *